(12) United States Patent
Yeo et al.

(10) Patent No.: US 8,819,049 B1
(45) Date of Patent: Aug. 26, 2014

(54) FRAME INJECTION BLOCKING (75) Inventors: Matthew Yeo, Los Angeles, CA (US);
Jeffrey Wilhelm, Los Angeles, CA (US);
Frank Barajas, Redondo Beach, CA (US); Pak Wai Yung, Los Angeles, CA (US); James Croall, Washington, DC (US)

(73) Assignee: Symantec Corporation, Mountain View, CA (US)

( * ) Notice: Subject to any disclaimer, the term of this patent is extended or adjusted under 35 U.S.C. 154(b) by 2413 days.

(21) Appl. No.: 11/243,479

(22) Filed: Oct. 3, 2005
(Under 37 CFR 1.47)

Related U.S. Application Data (63) Continuation-in-part of application No. 11/143,212, filed on Jun. 1, 2005.

(51) Int. Cl.
*G06F 7/00* (2006.01)
*G06F 17/30* (2006.01)

(52) U.S. Cl.
USPC .......................................... 707/765; 713/168

(58) Field of Classification Search
USPC .......... 707/1–10, 100–104.1, 765; 705/14.26, 705/14.47; 713/168
See application file for complete search history.

(56) References Cited

U.S. PATENT DOCUMENTS

| | | | |
|---|---|---|---|
| 6,029,245 A | | 2/2000 | Scanlan |
| 6,895,402 B1 * | | 5/2005 | Emens et al. ................... 707/10 |
| 7,093,279 B2 | | 8/2006 | Tretheway et al. |
| 2003/0135504 A1 * | | 7/2003 | Elvanoglu et al. ............ 707/100 |
| 2004/0172551 A1 | | 9/2004 | Fielding et al. |
| 2004/0198456 A1 * | | 10/2004 | Kelkar .......................... 455/566 |
| 2005/0071181 A1 | | 3/2005 | Christ et al. |
| 2005/0120229 A1 | | 6/2005 | Lahti |
| 2006/0021031 A1 | | 1/2006 | Leahy et al. |
| 2006/0068755 A1 | | 3/2006 | Shraim et al. |
| 2006/0069697 A1 | | 3/2006 | Shraim et al. |
| 2006/0136294 A1 | | 6/2006 | Linden et al. |
| 2006/0239430 A1 | | 10/2006 | Gue et al. |
| 2006/0288220 A1 | | 12/2006 | Pennington et al. |
| 2007/0039038 A1 | | 2/2007 | Goodman et al. |
| 2007/0107053 A1 | | 5/2007 | Shraim et al. |
| 2007/0192853 A1 | | 8/2007 | Shraim et al. |

OTHER PUBLICATIONS

"I Hate Frames Club," 2002, Bud Uglly Design, [online] [Retrieved on Jan. 29, 2008] Retrieved from the Internet<URL:http://buduglydesign.com/frame9806/f-java.htm>.

(Continued)

*Primary Examiner* — Hosain Alam
*Assistant Examiner* — Navneet K Ahluwalia
(74) *Attorney, Agent, or Firm* — Fenwick & West LLP (57) ABSTRACT

A parsing module identifies a framed page within a web page received from a network. The parsing module further identifies information regarding the frame such as the framed page's uniform resource locator. A lookup module accesses a memory module to determine if the identified information regarding the frame is included in a protection list stored in the memory module. A notification module notifies a client's user that the framing web page is fraudulent if the identified information regarding the frame is included in the protection list. Alternatively, the parsing module is adapted to identify a security tag within the framed page indicating that the framed page is not permitted to be displayed within a frame. If the framed page includes a security tag, the notification module notifies the client's user that the framing web page is fraudulent.

20 Claims, 5 Drawing Sheets

(56) References Cited

OTHER PUBLICATIONS

Emigh, A., "Online Identity Theft: Phishing Technology, Chokepoints and Countermeasure," ITTC Report on Online Identity Theft Technology and Countermeasures, Oct. 3, 2005, pp. 1-58.

Wu, M. et al., "Do Security Toolbars Actually Prevent Phishing Attacks," CHI 2006, ACM, Apr. 22-27, 2006, 10 pages.

"WebSiteOwner Quick Search," Dec. 15, 2005, 5 pages, [online] [Retrieved on Sep. 8, 2005] Retrieved from the Internet<URL:http://websiteownerinfo/tutorials/javascript/framebusterasp>.

\* cited by examiner

FRAME INJECTION BLOCKING

CROSS-REFERENCE TO RELATED APPLICATION

This application is a continuation-in-part of prior application Ser. No. 11/143,212, filed Jun. 1, 2005, which is hereby incorporated herein by reference.

BACKGROUND OF THE INVENTION

1. Field of the Invention

This invention pertains in general to computer security and in particular to techniques for preventing a fraudulent party from mimicking a legitimate web site.

2. Background Art

Internet fraud is a serious problem for both businesses and consumers. In particular, Internet users are under constant threat from various computer and network sources. For example, a fraudulent party may send an electronic mail to a user falsely claiming to be an established legitimate enterprise in an attempt to scam the user into surrendering private information that may be used for identity theft. The electronic mail directs the user to visit a web site where the user is asked to update personal information, such as passwords and credit card, social security, and bank account numbers, which the legitimate enterprise already possesses. The web site, however, is bogus and set up to steal the user's information. To steal the user's information, the fraudulent party makes the bogus web site look authentic enough that the user will believe that he or she is submitting the information to a legitimate web site.

One approach to prevent a fraudulent web site from imitating a legitimate site is to add non-deceivable content to a legitimate web page. For example, if a user creates an account with a legitimate site (e.g., hosted by a bank), the legitimate site may ask the user to choose a picture that is displayed if the user visits the legitimate site. In this case, bogus sites are not able to display the chosen picture on their web pages because they do not know which picture the user chose. As a result, if the user visits a web site that claims to be legitimate but does not display the chosen picture, the user is able to identify the web site as bogus.

This approach, however, can be circumvented by embedding a legitimate page from a web site that an attacker is trying to mimic within a frame of a fraudulent web page. For example, a fraudulent site may frame a web page in order to display dynamic content (e.g., a picture chosen by the user that is unknown to the fraudulent party) that cannot be copied to the fraudulent site. The fraudulent web site that frames a legitimate page may further induce the user to enter sensitive information into the fraudulent site's form. Alternatively, if the unwitting user logs in and browses through the legitimate web page contained in the child frame, a fraudulent web page residing in the parent window can use a script such as a JavaScript to harvest information entered into the legitimate web page and redirect it back to the fraudulent site.

Therefore, there is a need for a technique that effectively protects a user from a fraudulent web site that embeds a legitimate web page within a frame of a fraudulent web page.

DISCLOSURE OF INVENTION

The above need is met by a security system that monitors network traffic received by a client. The security system includes an interface module, a memory module, an analysis module, and a notification module. The interface module receives information regarding one or more web sites (e.g., their universal resource identifiers (URIs) such as uniform resource locators (URLs)) that are not permitted to be displayed within frames of another web page. The memory module further stores the information received by the interface module in a protection list.

The analysis module intercepts a web page from a network before the web page is displayed at the client. A parsing module identifies a frame within the intercepted web page. For example, the parsing module parses the hypertext markup language (HTML) source code of the intercepted web page to locate a frame tag. The parsing module further identifies information regarding a frame (e.g., the framed page's URL), for example, by parsing the located frame tag. A lookup module accesses the memory module to determine if the identified information regarding the frame is included in the protection list. The notification module is adapted to notify the client's user that the framing web page is fraudulent if the identified information regarding the frame is included in the protection list.

Alternatively, the parsing module is adapted to parse the source code of the framed page to identify a security tag, which indicates that the framed page is not permitted to be displayed within a frame. If the framed page includes a security tag, the notification module is adapted to notify the client's user that the framing web page is fraudulent.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
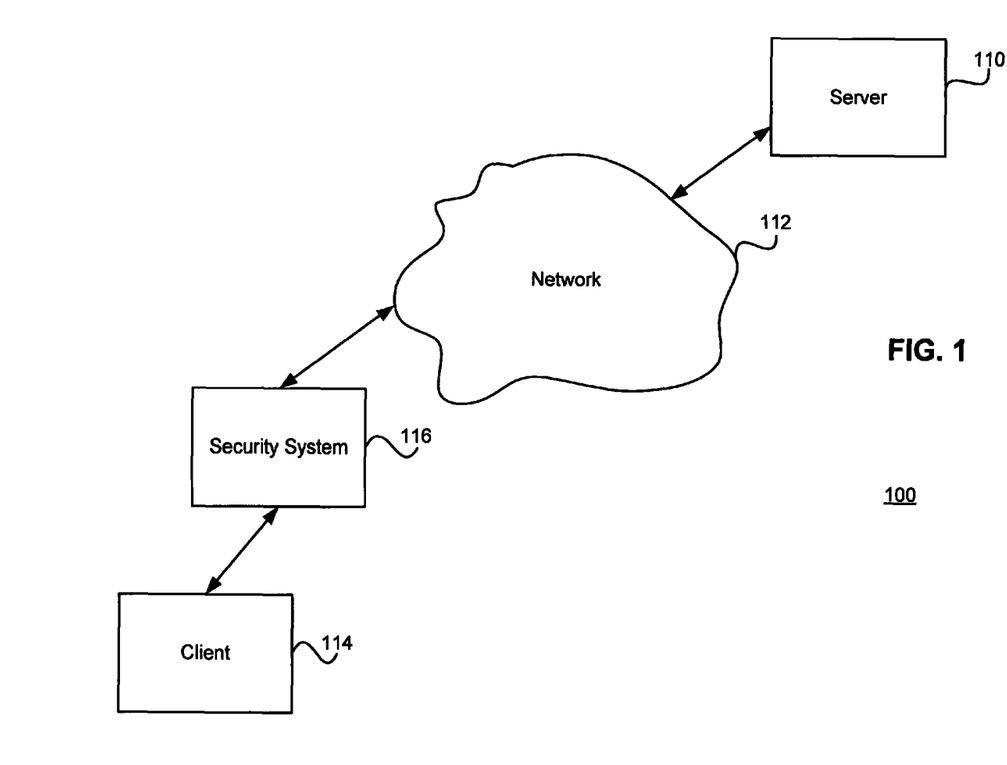
FIG. 1 is a high-level block diagram of a computing environment according to an embodiment of the present invention.

FIG. 1 is a high-level block diagram of a computing environment 100 according to an embodiment of the present invention. FIG. 1 illustrates a server 110 coupled to a network 112. The network 112 is also coupled to a client 114 through a security system 116. Even though one client 114 is shown in FIG. 1, multiple clients 114 may be coupled to the network 112 via one or more security systems 116. Furthermore, multiple servers 110 may be coupled to the network 112 for communicating with the client 114. Although FIG. 1 shows the security system 116 as a discrete component, in one embodiment the security system is located within the client 114.

The security system 116 monitors transfers of information between the client 114 and the network 112. For example, the security system 116 may be a hypertext transfer protocol (HTTP) proxy that inspects traffic that the client 114 sends to and receives from web servers on the network (such as server 110). Thus, the HTTP proxy is adapted to intercept a web page received by the client 114 before the web page is rendered (e.g., by a browser). Alternatively, the security system 116 may also be a helper object plugged into a browser of the client 114. The helper object is adapted to intercept a web page and analyze the web page's HTML code. The helper object can also perform an action on the browser. For example, the helper object can detect the browser's typical events, such as a user action on the browser; access the browser's menu and toolbar and make changes; create windows to display additional information on the currently viewed page; and install hooks to monitor messages and actions.

The network 112 provides communications between and among the other entities illustrated in the computing environment 100 of FIG. 1. In one embodiment, the network 112 is the Internet and uses wired and/or wireless links. The network 112 may include a cellular telephone network or other data network having a peering point with the Internet. The network 112 can also utilize dedicated or private communications links that are not necessarily part of the Internet. The entities illustrated in FIG. 1 use conventional communications technologies such as the transmission control protocol/Internet protocol (TCP/IP) to communicate over the network. The entities of FIG. 1 also use conventional communications protocols such as the HTTP, the simple mail transfer protocol (SMTP), the file transfer protocol (FTP), etc. The entities can also engage in secure communications using technologies including the secure sockets layer (SSL), Secure HTTP and/or virtual private networks (VPNs). The communicated messages utilize conventional data encodings such as HTML, extensible markup language (XML), etc.

The server 110 can include one or more standard computer systems configured to communicate with the client 114 via the network 112. For example, the server 110 can include a web server, FTP server, or other technology that enables the server 110 to interact with, and provide content to, the client 114 via the network 112.

In one embodiment, the client 114 is a conventional computer system executing, for example, a Microsoft Windows-compatible operating system (OS), Apple OS X, and/or a Linux-compatible OS. In another embodiment, the client 114 is another device having computer functionality, such as a personal digital assistant (PDA), cellular telephone, video game system, etc. The client 114 executes a browser that can display web pages received from the network 112. The browser can display a web page framed within another page.

According to an embodiment of the invention, the security system 116 monitors and analyzes web pages downloaded by the client 114 from the server 110 on the network 112. The security system 116 identifies any child pages framed within a parent web page. The security system 116 further determines if these framed pages are permitted to be displayed within frames of another web page. If the security system 116 determines that these framed pages are not permitted to be displayed within frames, it informs a user of the client 114 that the framing web page may be illegitimate and that submitting sensitive information to the framing web page or the framed pages is not recommended.

Figure 2:
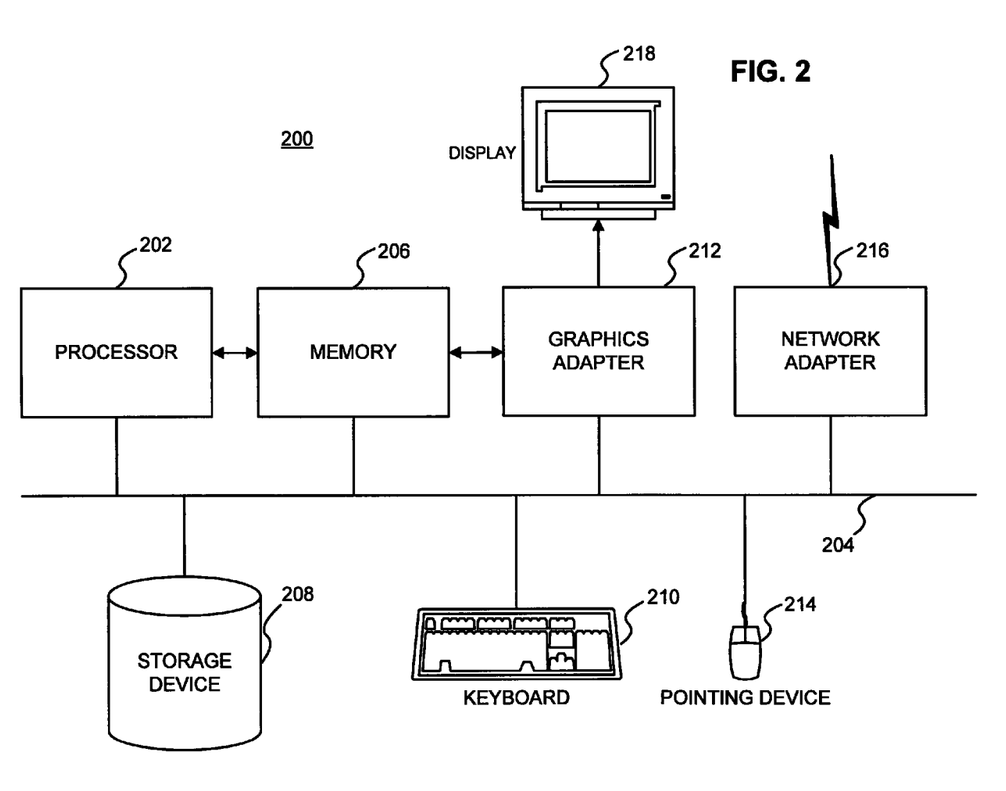
FIG. 2 is a high-level block diagram illustrating a functional view of a typical computer system acting as a client or other entity according to an embodiment of the present invention.

FIG. 2 is a high-level block diagram illustrating a functional view of a typical computer system 200 acting as a client 114, server 110, or security system 116 (in an embodiment having a discrete security system) according to an embodiment of the present invention. Computer systems 200 serving different roles can lack elements shown in FIG. 2 and/or have different or additional elements.

Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The processor 202 may be any general-purpose processor such as an INTEL x86, SUN MICROSYSTEMS SPARC, or POWERPC compatible-CPU. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The storage device 208 stores multiple computer files. The pointing device 214 may be a mouse, track ball, or other type of pointing device, and is used in combination with the keyboard 210 to input data into the computer system 200. The graphics adapter 212 displays images and other information on the display 218. The network adapter 216 couples the security system 116 with the network 112.

As is known in the art, the computer system 200 is adapted to execute computer program modules for providing functionality described herein. In this description, the term "module" refers to computer program logic for providing the specified functionality. A module can be implemented in hardware, firmware, and/or software. It will be understood that the modules described herein represent one embodiment of the present invention. Certain embodiments may include other modules. In addition, the embodiments may lack modules described herein and/or distribute the described functionality among the modules in a different manner. In one embodiment, the modules are stored on the storage device 208, loaded into the memory 206, and executed by the processor 202.

Figure 3:
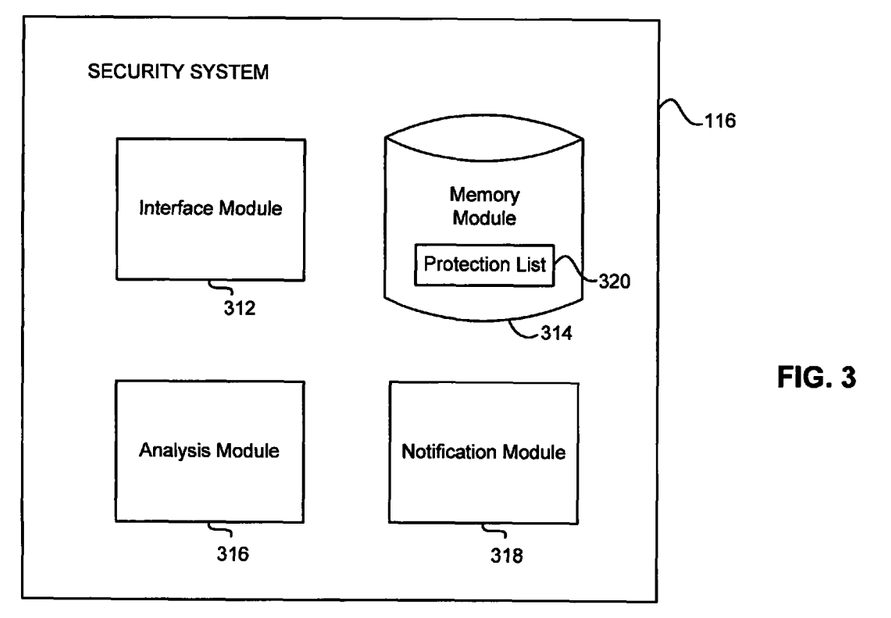
FIG. 3 is a high-level block diagram illustrating modules within a security system according to an embodiment of the present invention.

FIG. 3 is a high-level block diagram illustrating modules within the security system 116 according to an embodiment of the present invention. Those of skill in the art will understand that other embodiments of the security system 116 can have different and/or other modules than the ones described herein. In addition, the functionalities can be distributed among the modules in a manner different than described herein.

FIG. 3 illustrates an interface module 312, a memory module 314, an analysis module 316, and a notification module 318. According to an embodiment of the invention, the interface module 312 is adapted to receive information describing web pages that are not permitted to be displayed in frames. For example, the interface module 312 may receive a list of URLs of web pages that should not be displayed in frames. Such information can come directly from a legitimate web site, which determines those of its web pages that are not permitted to be displayed within frames and communicates the URLs of such web pages to the interface module 312. Alternatively, a third-party service may collect information regarding web pages that are not permitted to be displayed in frames. For example, a legitimate web site may subscribe to a service from a third-party service provider (e.g., for a fee) and provide to the third-party service provider a list of URLs identifying those of its web pages that are not permitted to be displayed in frames. The third-party service provider aggregates such information from multiple web sites and provides the information to the interface module 312.

The memory module 314 stores information utilized by the security system 116. In one embodiment, security system 116 stores the received information about web pages not permitted to be framed in a protection list 320 in the memory module 314. The memory module 314 can also store other information as may be required or desired.

Figure 4:
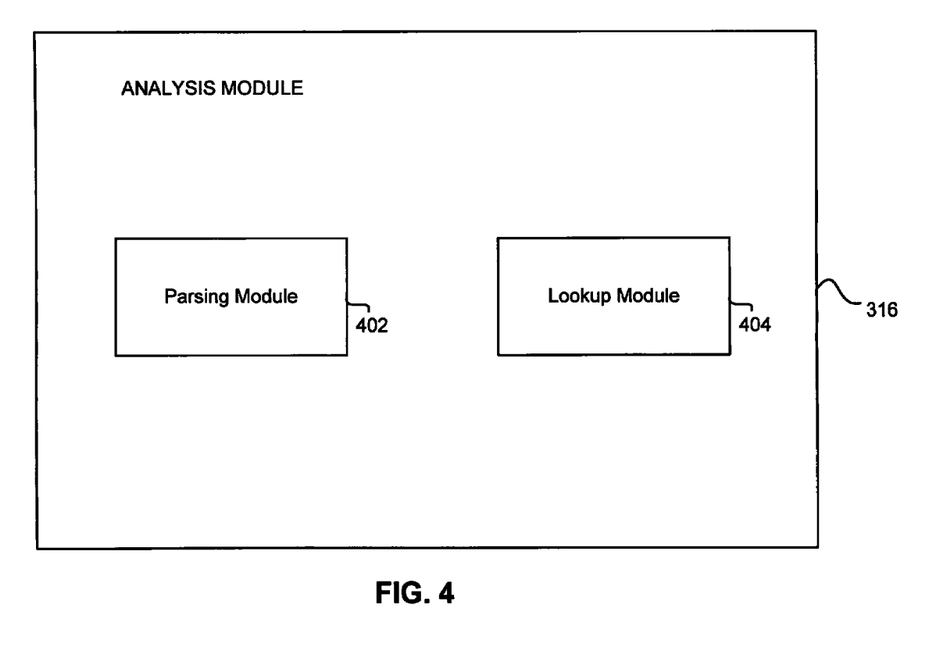
FIG. 4 is a high-level block diagram illustrating modules within an analysis module according to an embodiment of the present invention.

The analysis module 316 is configured to process network traffic, such as web pages, received by the client 114 and determine whether a page is impermissibly framed. FIG. 4 is a high-level block diagram illustrating modules within the analysis module 316 according to an embodiment of the present invention. Those of skill in the art will understand that other embodiments of the analysis module 316 can have different and/or other modules than the ones described herein. In addition, the functionalities can be distributed among the modules in a manner different than described herein.

FIG. 4 illustrates a parsing module 402 and a lookup module 404. The parsing module 402 identifies a frame (if any) embedded within a web page intercepted by the security system 116. Specifically, the parsing module 402 is adapted to scan the source code of the page and identify any code that creates a frame. For example, the source code of a web page defined by HTML source code might include the following language:

<HTML>
<HEAD>
</HEAD>
<FRAMESET COLS="25%,75%">
  <FRAME SRC="http://www._source_of_frame_content-.com/label.htm">
  <FRAME SRC="http://www._source_Of frame_content-.com/info.htm">
</FRAMESET>
<NOFRAMES>
Content
</NOFRAMES>
</HTML>

The parsing module 402 is adapted to parse this HTML document and locate any code that creates a frame. In one embodiment, the parsing module 402 locates any frame tags (e.g., <FRAME SRC="http://www._source_of frame_content-.com/label.htm">) within a <FRAMESET></FRAMESET> container. The parsing module 402 further parses the frame-creating code to identify the source of the content that will be displayed in the frame. The frame tag typically includes a URL that specifies a web page that serves as the source of the framed content. The exemplary snippet of HTML given above has two frame tags that respectively identify the sources of framed content as the pages named "label.htm" and "info.htm" at the address "http://www._source_of frame-_content.com."

The lookup module 404 is adapted to determine whether a framed page is permitted to be framed (i.e., whether the page can legitimately appear in a frame in the browser at the client 114). In one embodiment, the lookup module 404 receives URLs of framed pages from the parsing module 402 and determines whether the framed pages' URLs are in the protection list 320 stored in the memory module 314. If the lookup module 404 determines that a framed page's URL is included in the protection list 320, the analysis module 316 reports that the page is not permitted to be displayed within a frame. If the lookup module 404 determines that the framed page's URL is not included in the protection list 320, the analysis module 316 reports that the page is permitted to be framed.

In other embodiments, the analysis module 316 uses other information instead of, or in addition to, frame tags and URLs to determine whether a page is permitted to be framed. In one embodiment, pages that are not permitted to be framed include a special tag that indicates that the page should not be framed. This tag, called a "security tag," is established by the supplier of the security system 116 or another entity. Operators of web sites insert the security tag into web pages that should not be framed. The analysis module 316 recognizes the security tag within a web page, and reports that the page is not permitted to be framed.

If the analysis module 316 concludes that a framed page is not permitted to be displayed within a frame, the notification module 318 is adapted to alert the user that the parent page may be fraudulent or otherwise inform the user that submitting sensitive information to the parent page and the framed page is not recommended.

There are several ways for the notification module 318 to alert the user. In one way, the notification module 318 can provide visual and/or audible cues on the client 114 (e.g., by highlighting a text or changing a background color of the web page). Specifically, the notification module 318 can connect to the browser to modify the web page in a way to alert the user that the web page or the source of the web page may be fraudulent. Thus, the notification module 318 can change the color, font, or size of the web page's content to alert the user (e.g., by changing the framed page's content to "WARNING! The web site you have accessed may be a phishing site."). Furthermore, the notification module 318 may add a script, such as a JavaScript, to the framed web page that alerts the user to suspicious activity. This script may take actions such as altering the content of the page, creating pop-up warnings, preventing the framed page from being displayed or generating other interactive messages in order to notify the user.

In another way, the notification module 318 can provide visual and/or audible warnings to the user independently of the web page. For example, if the user moves a cursor of the pointing device 214 over to the web page, the notification module 318 may provide a pop-up message on the display 218 to warn the user that the web page may be fraudulent. Additionally, the notification module 318 can place an icon or other types of indicator on the browser rendering the web page to show the warning. Such an indicator can appear on a modified title bar, status bar, global task bar, or tray area of the browser. Furthermore, the indicator can appear on a special window on the display 218 and can include images, sounds, and animations.

Figure 5:
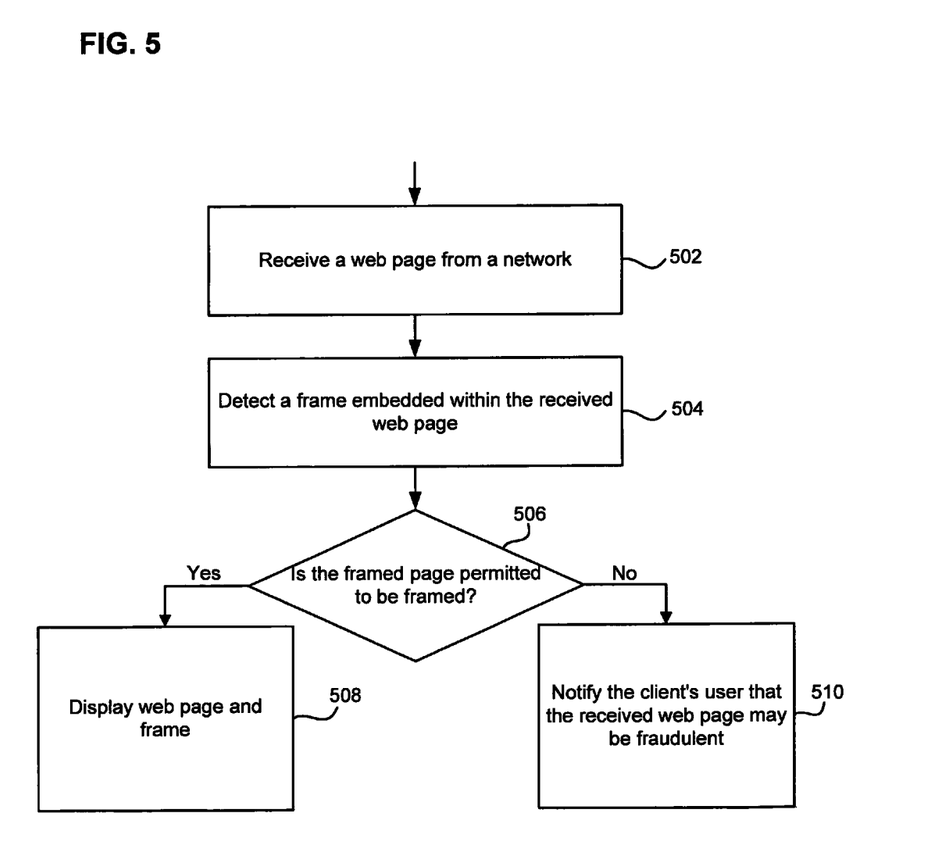
FIG. 5 is a flowchart illustrating steps performed by a security system according to an embodiment of the present invention.

FIG. 5 is a flowchart illustrating steps performed by the security system 116 according to an embodiment of the invention. The figure omits some possible steps. In addition, some embodiments perform different steps in addition to, or instead of, the ones described herein. Furthermore, the order of the steps can vary from that described herein.

The interface module 312 receives 502 a web page from the network 112. The analysis module 316 determines whether the page includes a frame. For example, the analysis module 316 parses the web page's HTML source code to identify a frame tag. If the web page includes a frame, the analysis module 316 further determines 506 whether the framed page is impermissibly framed. This latter determination can be made, for example, by determining whether the URL of the framed page is contained in the protection list 320 stored by the memory module 314, or contains a security tag that designates the page as not permitted to be framed.

If the embedded page is permitted to be displayed in a frame, the security system 116 allows 508 the framed web page to be displayed at the client 114 without a warning. But if the embedded page is not permitted to be displayed as a frame, the notification module 318 notifies 510 a user of the client 114 that the received web page may be fraudulent.

The above description is included to illustrate the operation of the preferred embodiments and is not meant to limit the scope of the invention. Where the description refers to "one" embodiment and/or "another" embodiment, it will be understood that the description is not necessarily referring to different embodiments. The scope of the invention is to be limited only by the following claims. From the above discussion, many variations will be apparent to one skilled in the relevant art that would yet be encompassed by the spirit and scope of the invention.

We claim:

1. A method of protecting a user of a client computer from computer frauds, comprising:
    determining that a web page includes a frame having a framed web page;
    receiving the framed web page;
    detecting that the framed web page includes a security tag indicating that the framed web page is not permitted to be framed; and
    responsive to detecting that the framed web page includes the security tag, notifying the user that the framed web page is impermissibly framed.

2. The method of claim 1, further comprising:
    receiving information describing one or more web pages that are not permitted to be framed; and
    storing the received information in a memory.

3. The method of claim 2, further comprising:
    identifying information in the web page including the frame describing the framed page; and
    accessing the memory to determine if the identified information describing the framed page is included in the information stored in the memory.

4. The method of claim 3,
    wherein the information stored in the memory comprises:
        a list of uniform resource locators describing web pages that are not permitted to be framed;
    wherein identifying the information in the web page including the frame describing the framed page comprises:
        parsing the web page including the frame to identify a frame tag within the web page, and
        identifying a uniform resource locator associated with the frame tag; and
    wherein accessing the memory comprises:
        determining if the identified uniform resource locator is included in the list of uniform resource locators.

5. The method of claim 1, wherein the web page including the frame is in hypertext markup language.

6. The method of claim 1, wherein notifying the user comprises:
    rendering a visual or audible cue on the client computer.

7. The method of claim 1, wherein the security tag is established by a supplier of a security system executing on the client computer.

8. The method of claim 1, further comprising:
    adding a script to the framed web page, the script configured to prevent the framed page from being displayed.

9. A system for protecting a user of a client computer from computer frauds, comprising:
    a computer-readable storage medium having embodied thereon executable program code;
    a parsing module residing on the computer-readable storage medium for identifying a framed page within a web page, wherein the parsing module is adapted to detect that the framed web page includes a security tag indicating that the framed web page is not permitted to be framed;
    an analysis module residing on the computer-readable storage medium for determining that the framed page is not permitted to be framed responsive to the framed web page including the security tag; and
    a notification module residing on the computer-readable storage medium for notifying the user that the framed page is not permitted to be framed responsive to the determination that the framed web page is not permitted to be framed.

10. The system of claim 9, further comprising:
    an interface module for receiving information describing one or more web pages that are not permitted to be framed; and
    a memory module for storing the received information.

11. The system of claim 10,
    wherein the parsing module is adapted to:
        identify information in the web page including the frame describing the framed web page; and
    wherein the analysis module is adapted to:
        access the memory module to determine if the identified information describing the framed web page is included in the information stored in the memory module.

12. The system of claim 11,
    wherein the information stored in the memory module comprises a list of uniform resource locators describing web pages that are not permitted to be framed;
    wherein the parsing module is adapted to identify the information describing the framed web page by:
        parsing the web page including the frame to identify a frame tag within the web page, and
        identifying a uniform resource locator associated with the frame tag; and
    wherein the analysis module is adapted to:
        access the memory module to determine if the identified uniform resource locator is included in the list of uniform resource locators.

13. The system of claim 9, wherein the web page including the frame is in hypertext markup language.

14. The system of claim 9, wherein the notification module is adapted to:
    render a visual or audible cue on the client computer.

15. A computer program product having a computer-readable storage medium having embodied thereon program code for protecting a user of a client computer from computer frauds, the program code comprising:
    a parsing module for identifying a framed page within a web page, wherein the parsing module is adapted to detect that the framed web page includes a security tag indicating that the framed web page is not permitted to be framed;
    an analysis module for determining that the framed page is not permitted to be framed responsive to the framed page including the security tag; and
    a notification module for notifying the user that the framed page is not permitted to be framed responsive to the determination that the framed page is not permitted to be framed.

16. The computer program product of claim 15, further comprising:
    an interface module for receiving information describing one or more web pages that are not permitted to be framed within another web page; and
    a memory module for storing the received information.

17. The computer program product of claim 16,
wherein the parsing module is adapted to:
  identify information in the web page including the frame describing the framed web page; and
wherein the analysis module is adapted to:
  access the memory module to determine if the identified information describing the framed web page is included in the information stored in the memory module.

18. The computer program product of claim 17,
wherein the information stored in the memory module comprises a list of uniform resource locators describing web pages that are not permitted to be framed;
wherein the parsing module is adapted to identify the information describing the framed web page by:
  parsing the web page including the frame to identify a frame tag within the web page, and
  identifying a uniform resource locator associated with the frame tag; and
wherein the analysis module is adapted to:
  access the memory module to determine if the identified uniform resource locator is included in the list of uniform resource locators.

19. The computer program product of claim 15, wherein the web page including the frame is in hypertext markup language.

20. The computer program product of claim 15, wherein the notification module is adapted to:
  render a visual or audible cue on the client.

\* \* \* \* \*